United States Patent
Hansson et al.

(10) Patent No.: US 6,678,524 B1
(45) Date of Patent: Jan. 13, 2004

(54) BEARER SELECTION IN A MOBILE COMMUNICATION SYSTEM HAVING BOTH CIRCUIT-SWITCHED AND PACKET-SWITCHED BEARERS

(75) Inventors: Rolf Hansson, Kungsängen (SE); Bernt Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 675 days.

(21) Appl. No.: 09/584,921

(22) Filed: May 31, 2000

(51) Int. Cl.[7] .................... H04Q 7/20; H04Q 7/24; H04L 12/66
(52) U.S. Cl. .................... 455/445; 455/422.1; 455/451; 455/452.2; 455/453; 455/448; 370/338; 370/352; 370/355; 370/356
(58) Field of Search .................... 370/338, 349, 370/352, 353, 354, 355, 356; 455/445, 448, 422, 450, 451, 452, 453, 456, 466

(56) References Cited

U.S. PATENT DOCUMENTS

| | | | |
|---|---|---|---|
| 5,528,664 A | * 6/1996 | Slekys et al. | 379/58 |
| 5,729,544 A | 3/1998 | Lev et al. | 370/352 |
| 5,802,465 A | 9/1998 | Hamalainen et al. | 455/403 |
| 5,873,043 A | 2/1999 | Comer | 455/458 |
| 5,978,368 A | * 11/1999 | Hjelm et al. | 370/347 |
| 5,978,685 A | 11/1999 | Laiho | 455/466 |
| 6,222,829 B1 | * 4/2001 | Karlsson et al. | 370/400 |
| 6,389,008 B1 | * 5/2002 | Lupien et al. | 370/352 |
| 6,400,712 B1 | * 6/2002 | Phillips | 370/355 |
| 6,519,458 B2 | * 2/2003 | Oh et al. | 455/445 |
| 6,519,461 B1 | * 2/2003 | Andersson et al. | 455/453 |
| 6,522,884 B2 | * 2/2003 | Tennison et al. | 455/445 |
| 6,560,457 B1 | * 5/2003 | Silver et al. | 455/445 |

FOREIGN PATENT DOCUMENTS

| | | |
|---|---|---|
| EP | 0 841 831 A2 | 5/1998 |
| GB | 2 283 154 A | 4/1995 |

OTHER PUBLICATIONS

EPO, Standard Search Report, Nov. 7, 2000.

* cited by examiner

*Primary Examiner*—William Trost
*Assistant Examiner*—Meless Zewdu

(57) ABSTRACT

A method and system for the routing and transmission of data to a mobile station. Upon receiving a request to deliver data addressed to the mobile station, a node in a circuit-switched network of a mobile telecommunications system identifies whether the mobile station is capable of receiving data via a packet data bearer. If so, the node further determines whether the data addressed to the mobile station should be sent via a packet data bearer in a packet-switched network instead of sending the data via a circuit-switched bearer. If it is determined that the data should be sent via a packet data bearer, then the data is transmitted to the mobile station using a selected packet data bearer. Alternatively, if the request to deliver data addressed to the mobile station is received by a node in the packet-switched network, that node determines whether the data should be sent via a circuit-switched bearer in the circuit-switched network. If so, then the data is rerouted and transmitted to the mobile station using a circuit-switched bearer.

7 Claims, 3 Drawing Sheets

BEARER SELECTION IN A MOBILE COMMUNICATION SYSTEM HAVING BOTH CIRCUIT-SWITCHED AND PACKET-SWITCHED BEARERS

BACKGROUND OF THE INVENTION

1. Technical Field of the Invention

The present invention relates in general to routing of data in mobile telecommunications systems, and in particular to bearer selection in cellular systems.

2. Description of Related Art

Many cellular telephone networks support the transmission of short message service (SMS) messages between short message entities, such as mobile stations and short message terminals. The purpose of a short message service is to provide a means for transferring textual messages or other types of data messages between the short message entities using the communications environment provided by a cellular telephone network.

Generally, such short message service messages originate or terminate at a subscriber mobile station. In particular, an SMS message is delivered from an originating short message entity to an SMS message center via a fixed telephone network and/or a cellular telephone network. The message center serves as a store and forward center for receiving and delivering SMS messages to a destination short message entity. Upon receiving an SMS message intended for the destination short message entity, the SMS message center forwards the message to that entity.

Because of higher than anticipated demand, SMS traffic has grown at a rapid rate. In existing mobile systems, the only way to cope with increases in SMS traffic is to install additional base station and switching equipment. Unfortunately, it is nearly impossible to expand the system fast enough to keep up with the growing demand. As a result, the SMS traffic can cause severe congestion in the mobile system. This problem is exacerbated by the fact that the use of SMS as a bearer for data transmissions competes with usage of the same channel for voice communications. Thus, SMS congestion can displace voice traffic, thereby reducing the capacity for voice calls below an acceptable service level. Similarly, it is anticipated that new data communication capabilities will also place strains on the available packet data resources. In some cases, packet data networks might become so congested that the capacity for data traffic is reduced below an acceptable level.

There is a need, therefore, for a method and system for reducing congestion in a mobile telecommunications network. Preferably, such a method and system would result in an efficient allocation of bearer resources and would reduce the likelihood that voice calls or data connections are displaced by SMS or other data traffic.

SUMMARY OF THE INVENTION

The present invention comprises a method and system for selecting between a circuit-switched network and a packet-switched network for a transmission of data. In accordance with one embodiment of the method, when a request to deliver data to a mobile station is received in a node of the circuit-switched network, the node identifies whether the mobile station has the capability to receive data via one or more packet data bearers. If the mobile station does have such a capability, the node further determines whether the data should be delivered using one of the packet data bearers in the packet-switched network instead of using a circuit-switched bearer. This determination can be made based simply on whether packet data bearers are available or based on an analysis of the current resource and load situation in the bearer sub-systems. Assuming that the node determines that the data should be delivered using a packet data bearer, the data is rerouted to the packet-switched network for delivery to the mobile station.

In accordance with an alternative embodiment of the method, when a request to deliver data to a mobile station is received at a node in the packet-switched network, the packet-switched node determines whether the data should be transmitted via a circuit-switched bearer instead of using a packet data bearer. The determination can be made based on the resource and load situation in the bearer sub-systems. If a circuit-switched bearer is to be used, the packet-switched node reroutes the data to the circuit-switched network for delivery to the mobile station.

The system of the invention includes a circuit-switched network that supports transmission of data via circuit-switched bearers and a packet-switched network that supports transmission of data via packet data bearers. A first switching node is located in one of the networks and a second switching node is located in the other of the networks. The first switching node selects between the networks for delivery of particular data to a mobile station. If the first switching node selects delivery using the other network, the data is rerouted to the second switching node via an interconnection between the circuit-switched and packet-switched networks. The second switching node then selects a particular bearer for transmitting the data and sends the data to the mobile station using the selected bearer. The delivery selection is based on the resource and load situation in the networks.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
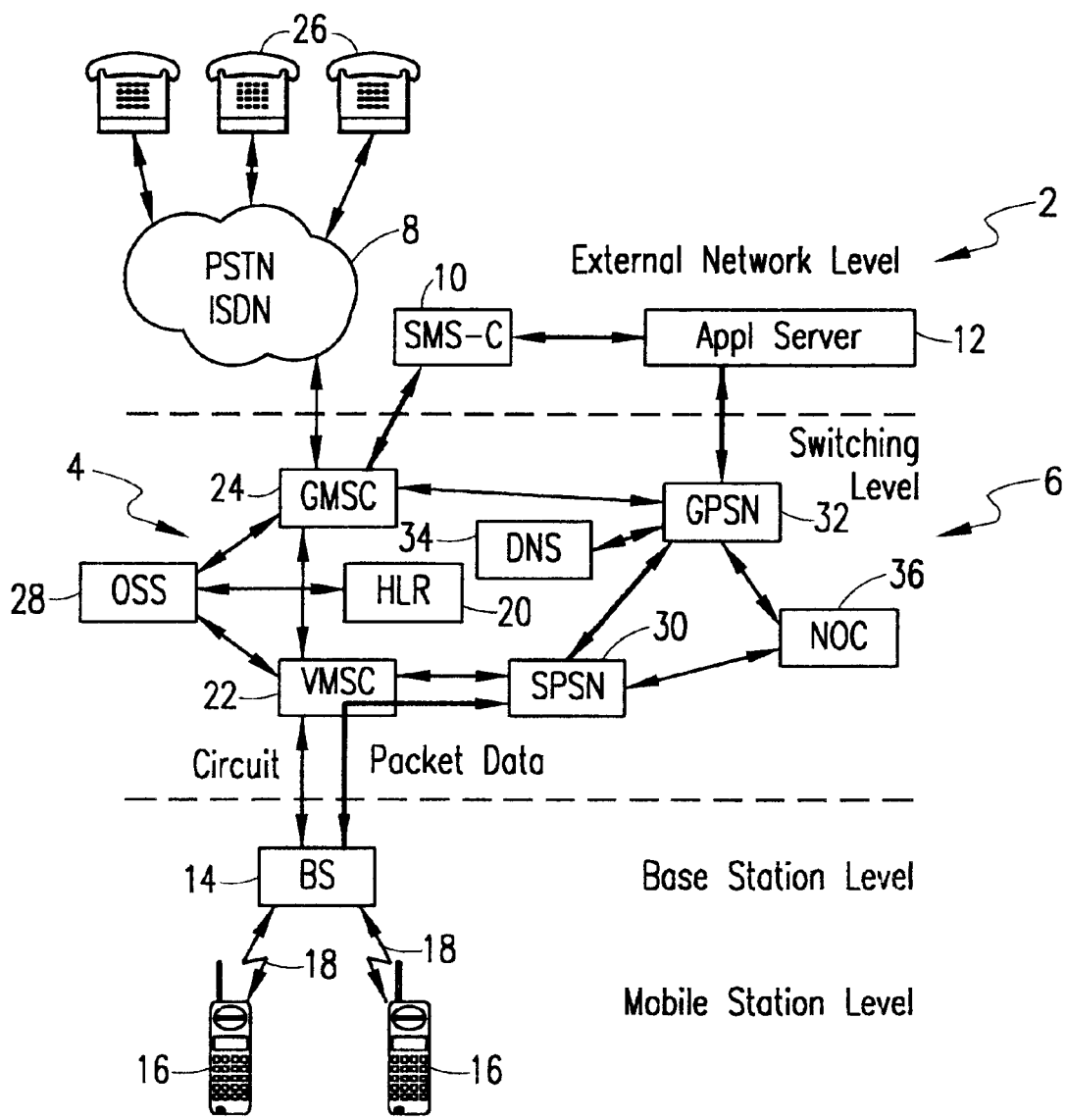
FIG. 1 is a personal digital cellular (PDC) system that can be used to implement the present invention.

Reference is now made to the Drawings wherein like reference characters denote like or similar parts throughout the various Figures. Referring now to FIG. 1, there is illustrated a personal digital cellular (PDC) system 2 that can be used to implement the present invention. The PDC system 2 includes a circuit-switched network 4 and a packet-switched network 6. These networks 4 and 6 can interact with other external networks, such as a public switched telephone network (PSTN)/integrated services digital network (ISDN) 8, a short message service center (SMS-C) 10, and an application server (e.g., in an IP network) 12. The circuit-switched and packet-switched networks 4 and 6 are also interconnected with a base station (BS) 14 to communicate with mobile stations 16 via an air interface 18 between the base station 14 and each mobile station 16. Although the invention is described in connection with a PDC system, persons of ordinary skill in the art will understand that the invention is not necessarily limited to a PDC system but can be implemented in other types of communications systems that include both circuit-switched and packet-switched capabilities.

Each mobile station 16 is associated with a home location register (HLR) 20 in the circuit-switched network 4 that stores subscription, current location, and preference information for the mobile station 16. A plurality of mobile switching centers (MSCs) in the circuit-switched network 4 access the home location register 20, as necessary, to retrieve information relating to the mobile station 16. A visited mobile switching center (VMSC) 22 serves the base stations 14 in and around the area where the particular mobile station 16 is currently located. In addition, a gateway mobile switching center (GMSC) 24 links the circuit-switched network 4 to external networks. An operations support system (OSS) serves to control the various nodes in the circuit-switched network 4.

Using the circuit-switched network 4, calls can be established among mobile stations 16 and between mobile stations 16 and subscriber stations 26 in the PSTN 8. In addition, SMS messages are also sent between the short message service center 10 and SMS-capable mobile stations 16 via the circuit-switched network 4.

For mobile stations 16 that are capable of handling packet data, data packets can be sent via the same base stations 14, and in many cases the same VMSCs 22, that are used in the circuit-switched network. The base stations 14 could also be connected directly to a Switching Packet Support Node (SPSN). The packet-switched network 6 includes a plurality of SPSNs 30 (only one is illustrated) and a Gateway Packet Support Node (GPSN) 32. The SPSN 30 is used for routing data packets to and from the VMSC 22 for transmission to and from mobile stations 16 in a particular area served by the SPSN 30. The GPSN 32 interconnects with external networks to route data packets between SPSNs 30 and nodes in the external networks, such as the application server 12. The GPSN 32 is further interconnected with a domain name server (DNS) 34 for use in communications via the Internet. A network operations control (NOC) node 36 controls the operation of the packet-switched network 6.

When an SMS message intended for a mobile station 16 is received at the SMS center 10, the SMS message is typically delivered via the GMSC 24 to the VMSC 22 that serves the area where the mobile station 16 is located. The VMSC 22 in turn forwards the SMS message to the mobile station 16 via the base station 14.

In accordance with the present invention, however, SMS messages and other data destined for a mobile station 16 can instead be sent to the mobile station 16 using the packet-switched network 6. In particular, the packet-switched network 6 can temporarily or selectively take over some or all of the SMS traffic. Furthermore, the packet-switched network 6 can be used for data transmissions involving more demanding applications, rather than delivering such data via the circuit-switched network 4.

In a preferred embodiment, when the GMSC 24 receives information addressed to a mobile station 16 from a connected data source such as the SMS center 10, the GMSC 24 accesses the HLR 20 to determine what types of bearers are available in the addressed mobile station 16 and whether the mobile station 16 has valid subscriptions for packet data. If so, the SMS message or other data is sent to the mobile station 16 via an available packet data bearer. Such routing of the SMS message or other data can be performed by sending the addressed information from the GMSC 24 to the GPSN 32 or by instructing the SMS center 10 or another server in an external network to send the addressed information via the packet-switched network 6. In particular, the SMS center 10 forwards the addressed information to the application server 12, which in turn sends the addressed information to the GPSN 32. As a result, resources in the circuit-switched network 4 are reserved for use in voice communications and for use in data communications with mobile stations 16 that do not support packet data bearers, thereby reducing congestion in the circuit-switched network 4.

In accordance with one embodiment of the invention, a packet data bearer is used whenever one is available. In an alternative embodiment, a determination of whether a packet data bearer should be used is based on the present load and resource situation in the subsystems that provide the circuit-switched and packet-switched bearers. For example, a packet data bearer might be used if a certain level of congestion exists in the circuit-switched network 4. In yet another embodiment, when information is sent via the packet-switched network, the application server 12 sends a transmission request that includes a parameter identifying an application type for the data that is addressed to the mobile station 16. Then, when the GPSN 32 checks the location of the mobile station 16 (i.e., by accessing information stored in the HLR 20), the GPSN 32 also checks the mobile station's bearer capability and the resource situation in the subsystems that provide the bearers. Based on the results of these checks, the GPSN 32 can select an available bearer that is most suitable (e.g., most efficient) for delivering data of the identified application type.

Although the decision regarding whether to send the SMS message or other data via the circuit-switched network 4 or the packet-switched network 6 is described above as being made by the GMSC 24, this decision can also be made in other nodes within or connected to the circuit-switched network 4, such as the OSS node 28 or the SMS center 10, assuming these nodes can access the information in the HLR 20 to determine whether the addressed mobile station 16 is capable of receiving data via the packet-switched network 6. In some cases, for instance, the SMS center 10 can be part of the PDC network rather than being located in an external network. In addition, even if the decision regarding circuit-switched or packet-switched delivery is to be made by a node within the circuit-switched network 4, it is not necessary that the originating SMS center 10 or other external network node actually send the SMS message or other data that is destined for the mobile station 16 to the decision-making node. Instead, a message indicating that there is a need to send an SMS message or other data to the mobile station 16 can be sent to the decision-making node. The decision-making node can then select the delivery mechanism and provide appropriate routing instructions to the originating SMS center 10 or other external network node.

Currently, the circuit-switched bearers of cellular networks tend to be more likely to be over-utilized compared with the packet-switched bearers. As the number of packet data services increase and as usage of such services by cellular subscribers increases, there might be situations in which congestion occurs in the packet-switched networks 6. In accordance with an alternative embodiment of the present invention, when a data message destined for a mobile station 16 are received by the GPSN 32 or some other node in the packet-switched network 6, the data message can be re-routed or diverted for delivery by the circuit-switched network 4 using, for example, the SMS infrastructure. This capability would help to reduce congestion in the packet-switched network. Depending on the preferences of the cellular operator, a circuit-switched bearer could be used either whenever one is available or based on the present load and resource situation in the subsystems that provide the circuit-switched and packet-switched bearers.

Figure 2:
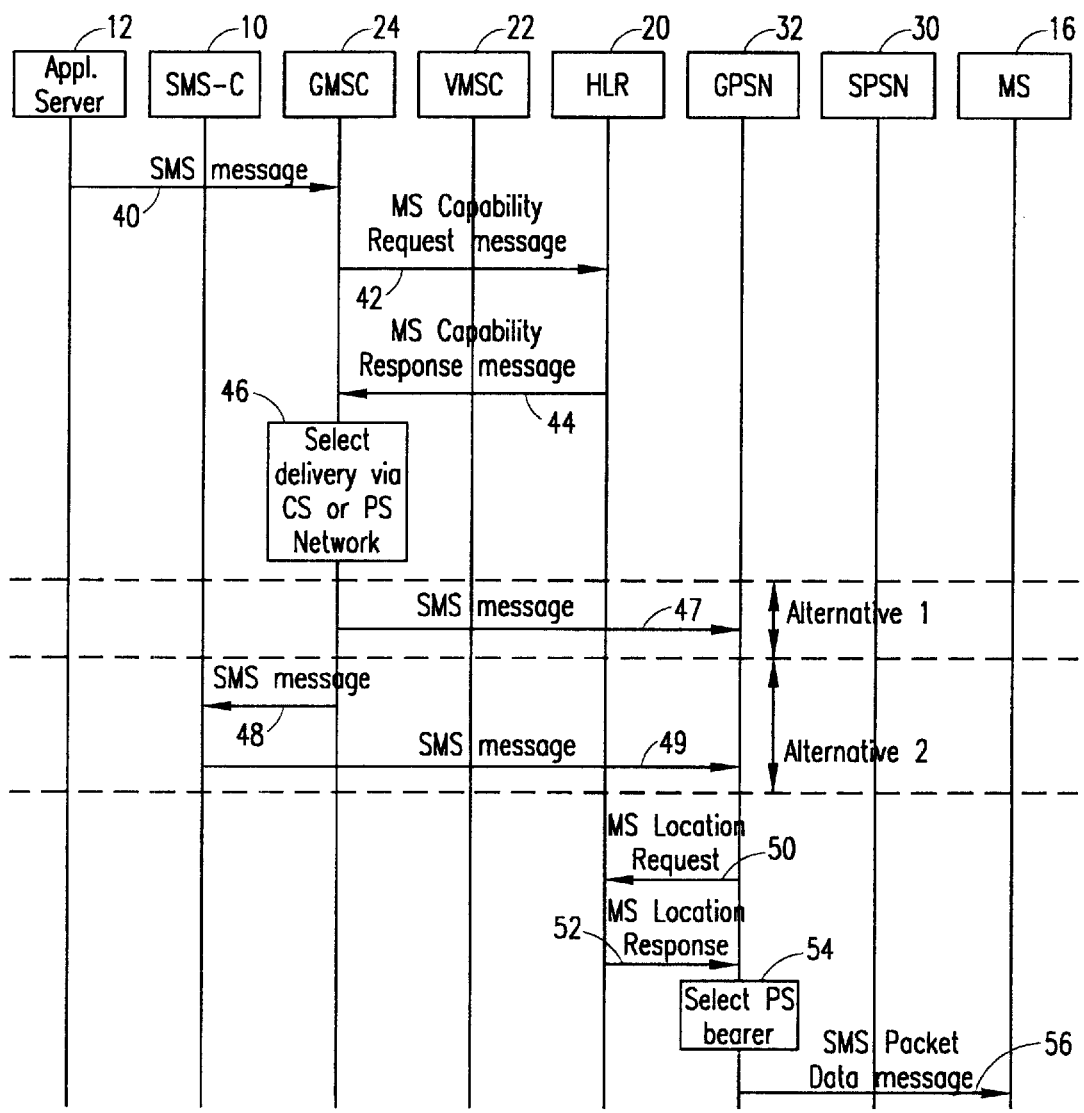
FIG. 2 is a message flow and signaling diagram illustrating the operation of a PDC system in accordance with one embodiment of the present invention.

Referring now to FIG. 2, there is depicted a message flow and signaling diagram illustrating the operation of a PDC system 2 in accordance with one embodiment of the present invention. An SMS message addressed to a mobile station 16 is sent from an application server 12 to a GMSC 24 in the PDC system 2. In response, the GMSC 24 sends a mobile station capability request message 42 to the HLR 20 to request information regarding the mobile station subscriptions and information indicating which packet data bearers are used by the mobile station 16. If desired, the mobile station capability request 42 can also request other information relating to the mobile station 16, such as the mobile station's current location. The requested information is then returned to the GMSC 24 in a mobile station capability response message 44.

Using the information from the HLR 20, the GMSC 24 selects whether the SMS message will be delivered via the circuit-switched network 4 or packet-switched network 6 at step 46. This decision can be based simply on whether the mobile station 16 has the capability to receive data via a packet data bearer or can be based on the current availability of resources (i.e., bearers' processor capacity) in the circuit-switched network 4 and possibly in the packet-switched network 6. For example, the packet-switched network 6 might be selected when the circuit-switched network 4 is congested. Assuming the GMSC 24 selects the packet-switched network 6 for delivery, the SMS message is sent, in a first alternative, from the GMSC 24 to the GPSN 32 (as indicated at 47). The SMS message can be sent over a connection linking the GMSC 24 to the GPSN 32 or can be sent via one or more intermediate nodes in external networks. In a second alternative, the SMS message is sent to an SMS center 10 (as indicated at 48), which in turn forwards the message to the GPSN 32 (as indicated at 49).

To deliver the data in the SMS message, the GPSN 32 needs to first retrieve information identifying the location of the mobile station 16. Accordingly, the GPSN 32 transmits a location request message 50 to the HLR 20 (e.g., via the GMSC 24). In response, the HLR 20 sends to the GPSN 32 a location response message 52, which includes current location information for the mobile station 16 and which can further include any other desired information relating to the mobile station 16. At step 54, the GPSN 32 selects a particular packet data bearer for delivering the SMS message data to the mobile station 16. This selection can be based on a variety of factors, such as the availability of resources in the packet-switched network 6, the capabilities and subscriptions of the mobile station 16, and the present location of the mobile station 16. The GPSN 32 then sends an SMS packet data message 56 to the mobile station 16 using the selected packet data bearer. The SMS packet data message 56 is delivered via an SPSN 30 that serves the area where the mobile station 16 is currently located. The SPSN 30 in turn forwards the SMS packet data message 56 to the mobile station 16 using a VMSC 22 and base station 14 that serve the area where the mobile station 16 is located.

Figure 3:
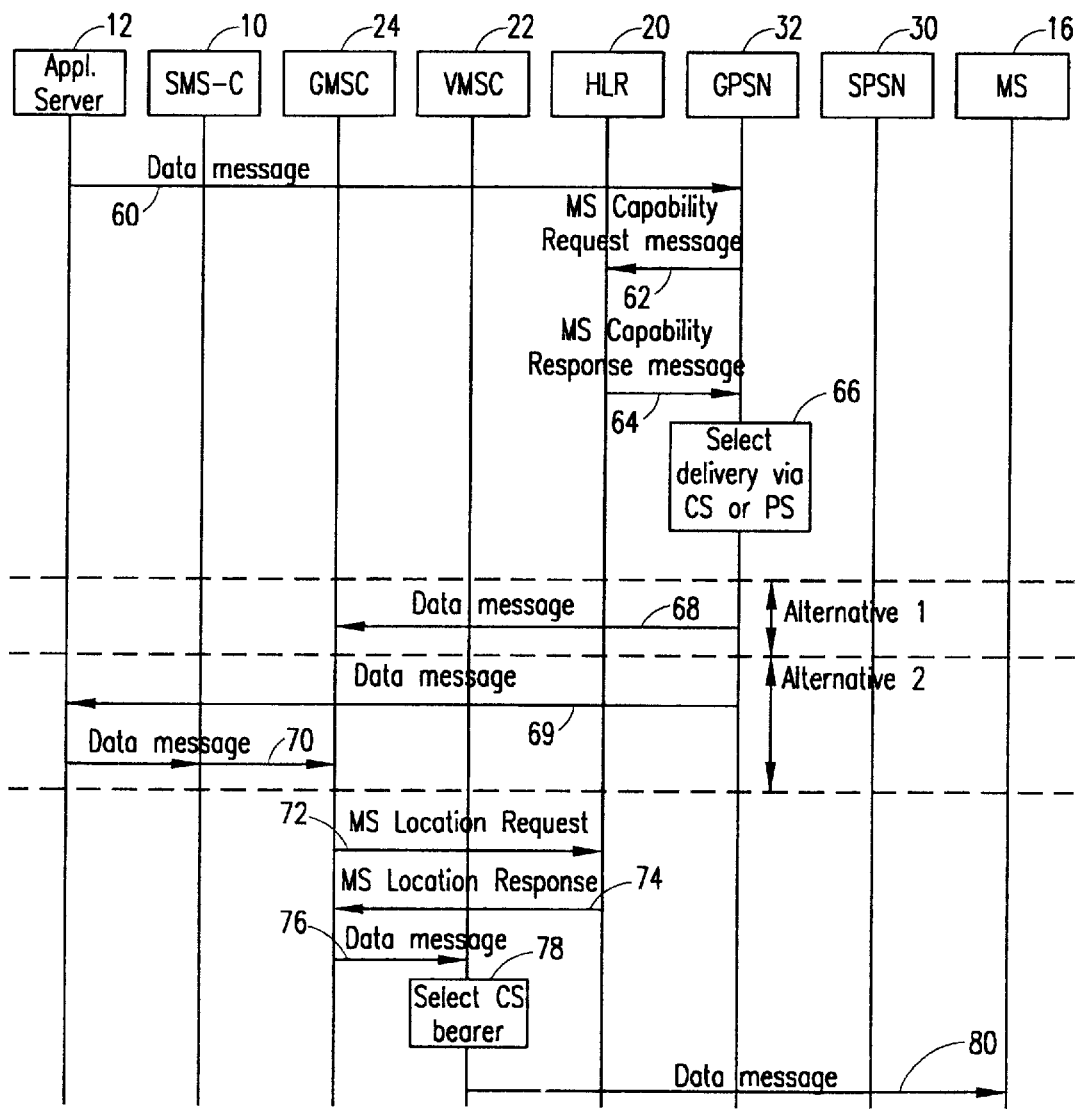
FIG. 3 is a message flow and signaling diagram illustrating the operation of a PDC system in accordance with another embodiment of the present invention.

Referring now to FIG. 3, there is depicted a message flow and signaling diagram illustrating the operation of a PDC system 2 in accordance with another embodiment of the present invention. In this case, a data message 60 addressed to a mobile station 16 is sent from an application server 12 in an external network to a GPSN 32 in the PDC system 2. Upon receiving the data message 60, the GPSN 32 sends a mobile station capability request message 62 to the HLR 20 that is associated with the mobile station 16 to request information regarding the mobile station subscriptions and information indicating which packet data and circuit-switched bearers are used by the mobile station 16. The mobile station capability request 62 can also request other information relating to the mobile station 16, such as the mobile station's current location. The requested information is then returned to the GPSN 32 in a mobile station capability response message 64.

Using the information from the HLR 20, the GPSN 32 selects whether the data message will be delivered via the circuit-switched network 4 or packet-switched network 6 at step 66. This decision can be based simply on whether the mobile station 16 has the capability to receive data via a packet data and/or circuit-switched bearer or can be based on the current availability of resources (i.e., bearers' processor capacity) in the circuit-switched network 4 and/or in the packet-switched network 6. For example, the circuit-switched network 4 might be selected for use in data message delivery when the packet-switched network 6 is congested.

Assuming the GPSN 32 selects the circuit-switched network 4 for delivery, the data message is rerouted directly to the GMSC 24 in a first alternative (as indicated at 68). In a second alternative, on the other hand, the data message is sent back to the application server 12 (as indicated at 69). Alternatively, the application server 12 can simply be instructed to resend the data message via the circuit-switched network 4. In either case, the application server 12 then sends the data message to the GMSC 24 (as indicated at 70). Preferably, the data message 70 includes an application type parameter that identifies the type of application to which the data message relates.

To deliver the data message, the GMSC 24 needs to first retrieve information identifying the location of the mobile station 16. Accordingly, the GMSC 24 transmits a location request message 72 to the HLR 20. In response, the HLR 20 sends to the GMSC 24 a location response message 74, which includes current location information for the mobile station 16 and which can further include any other desired information relating to the mobile station 16. Based on the location information, the GMSC 24 identifies the appropriate VMSC 22 (i.e., the VMSC 22 that serves the area where the mobile station 16 is currently located) and forwards the data message to the identified VMSC 22 (as indicated at 76). At step 78, the VMSC 22 selects a particular packet data bearer for delivering the data message to the mobile station 16. This selection can be based on a variety of factors, such as the availability of resources in the circuit-switched network 6, the capabilities and subscriptions of the mobile station 16, and the present location of the mobile station 16. Furthermore, if the application type parameter was included in the data message 70, the VMSC 22 preferably selects a circuit-switched bearer that is most suitable (e.g., as determined by the efficiency, reliability, or speed of the bearer) for delivering the data message. The VMSC 22 then sends the data message to the mobile station 16 using the selected bearer (as indicated at 80).

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A mobile telecommunications system, comprising:

a circuit-switched network supporting transmission of data to a mobile station via at least one circuit-switched bearer;

a packet-switched network supporting transmission of data to the mobile station via at least one packet data bearer;

a first switching node located in one of the circuit-switched network and packet-switched network, said first switching node supporting a first type of bearer and selecting between delivery of data addressed to the mobile station using said first type of bearer and delivery of the data addressed to the mobile station using a second type of bearer, wherein the first type of bearer and the second type of bearer are each selected from the group consisting of circuit-switched bearers and packet data bearers, and wherein the first switching node selects the first type of bearer if a bearer of the first type is available and a level of congestion in the network in which the first switching node is located is below a predefined level, and selects the second type of bearer if the level of congestion in the network in which the first switching node is located is above the predefined level;

an interconnection between the circuit-switched network and the packet-switched network for rerouting the data addressed to the mobile station when the first switching node selects delivery of the data addressed to the mobile station using the second type of bearer; and a second switching node located in the other of the circuit-switched network and packet-switched network relative to the first switching node, said second switching node supporting the second type of bearer and serving to select a particular bearer of the second type of bearer and to route the data addressed to the mobile station using said particular bearer when the first switching node selects delivery of the data addressed to the mobile station using the second type of bearer.

2. The system of claim 1, wherein the first switching node is located in the circuit-switched network and the second switching node is located in the packet data network.

3. The system of claim 2, further comprising a short message service center for forwarding a short message service message, wherein the short message service message comprises the data addressed to the mobile station.

4. The system of claim 2, wherein the first switching node comprises a gateway mobile switching center and the second switching node comprises a gateway packet support node.

5. The system of claim 1, wherein the first switching node is located in the packet data network and the second switching node is located in the circuit-switched network.

6. A mobile telecommunications system, comprising:

a circuit-switched network supporting transmission of data via at least one circuit-switched bearer;

a packet-switched network supporting transmission of data via at least one packet data bearer;

a first switching node located in one of the circuit-switched network and packet-switched network, said first switching node supporting a first type of bearer and selecting between delivery of data addressed to a mobile station using said first type of bearer and delivery of the data addressed to the mobile station using a second type of bearer, wherein the first type of bearer and the second type of bearer are each selected from the group consisting of circuit-switched bearers and packet data bearers;

an interconnection between the circuit-switched network and the packet-switched network for rerouting the data addressed to the mobile station when the first switching node selects delivery of the data addressed to the mobile station using the second type of bearer;

a second switching node located in the other of the circuit-switched network and packet-switched network relative to the first switching node, said second switching node supporting the second type of bearer and serving to select a particular bearer of the second type of bearer and to route the data addressed to the mobile station using said particular bearer when the first switching node selects delivery of the data addressed to the mobile station using the second type of bearer; and an application server for sending a message including the data addressed to the mobile station, said message further including a parameter identifying the application type for the data addressed to the mobile station, wherein said parameter is used to select the particular bearer for use in delivering the data addressed to the mobile station.

7. A mobile telecommunications system, comprising:

a circuit-switched network supporting transmission of data via at least one circuit-switched bearer;

a packet-switched network supporting transmission of data via at least one packet data bearer;

a first switching node located in one of the circuit-switched network and packet-switched network, said first switching node supporting a first type of bearer and selecting between delivery of data addressed to a mobile station using said first type of bearer and delivery of the data addressed to the mobile station using a second type of bearer, wherein the first type of bearer and the second type of bearer are each selected from the group consisting of circuit-switched bearers and packet data bearers;

an interconnection between the circuit-switched network and the packet-switched network for rerouting the data addressed to the mobile station when the first switching node selects delivery of the data addressed to the mobile station using the second type of bearer;

a second switching node located in the other of the circuit-switched network and packet-switched network relative to the first switching node, said second switching node supporting the second type of bearer and serving to select a particular bearer of the second type of bearer and to route the data addressed to the mobile station using said particular bearer when the first switching node selects delivery of the data addressed to the mobile station using the second type of bearer; and a home location register associated with the mobile station, said home location register storing information regarding bearer capabilities for the mobile station, wherein the first switching node retrieves said information from the home location register for use in selecting between delivery using the first type of bearer and delivery using the second type of bearer.

* * * * *